UNITED STATES PATENT OFFICE.

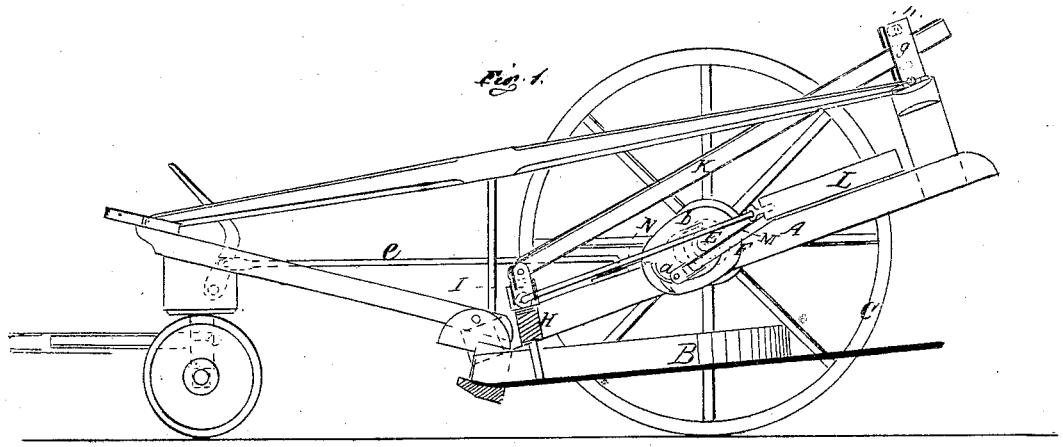
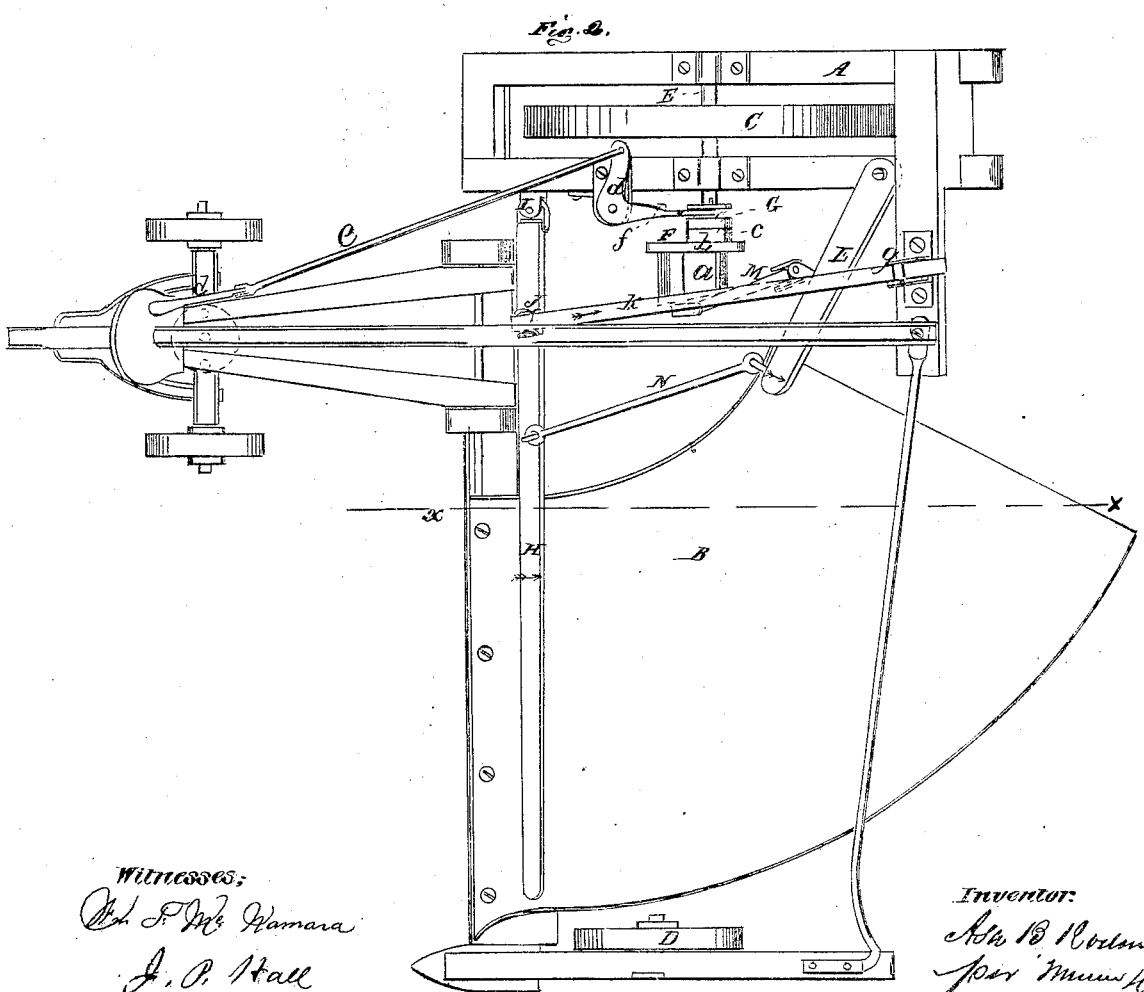

ASA B. RODMAN, OF LYONS, IOWA.

IMPROVEMENT IN RAKES FOR HARVESTERS.

Specification forming part of Letters Patent No. 44,749, dated October 18, 1864.

*To all whom it may concern:*

Be it known that I, ASA B. RODMAN, of Lyons, in the county of Clinton and State of Iowa, have invented a new and Improved Raking Device for Harvesters; and I do hereby declare that the following is a full, clear, and exact description thereof, which will enable others skilled in the art to make and use the same, reference being had to the accompanying drawings, making a part of this specification, in which—

Figure 1 represents a side sectional view of my invention, taken in the line $x\ x$, Fig. 2; Fig. 2, a plan or top view of the same.

Similar letters of reference indicate like parts.

This invention relates to a new and improved automatic raking attachment for harvesters; and it consists in the employment or use of a cam, a rising-and-falling and forward-and-backward-moving rake, a lever, and connecting-rod, all arranged in such a manner as to form a simple and efficient device for the intended purpose.

A represents the main frame of a harvester, and B the platform on which the cut grain falls, said platform being a portion of a circle, as shown clearly in Fig. 2.

C is a driving-wheel placed in the main frame A, the platform being supported at its grain end by a small wheel, D.

On the inner end of the axle E of the wheel C there is placed loosely a cam, F, which may be described as being a curved plate, $a$, attached to one side of an arm, $b$, which is secured eccentrically to a hub, $c$, the latter being placed loosely on the axle E and secured to it, when desired, by means of a clutch, G, the latter being operated through the medium of levers $d\ d$, a rod, $e$, and a spring, $f$, the spring having a tendency to keep the clutch connected with the hub $c$ of the cam.

H represents the rake-head, which is attached at one end by a universal joint, I, with the main frame A, and at a point which is the center of a circle of which the platform B forms a part.

To the rake-head H there is connected, by a universal joint, J, a lever, K, which extends back over the cam F and passes through a guide, $g$, on the back of the main frame, as shown in both figures.

L is a horizontal lever at the back of the main frame, which is connected near its center to the cam F and eccentrically with the axle E by a rod, M, said lever being connected at its inner or disengaged end to the rake-head H by a rod, N. The rake-head H is provided with teeth $h$ in the usual way.

The operation is as follows: As the machine is drawn along a vibrating motion is communicated to the lever L from the cam F by the rod M, and the rake-head H is moved back and forth over the platform B from the lever L by means of the rod N. A rising-and-falling movement is given the rake-head through the medium of the cam F and lever K, the cam elevating the lever and the latter elevating the rake-head and keeping it in an elevated state during the movement of the latter from the rear to the front end of the platform, the cam being free from the lever K during the backward movement of the rake-head, so that the teeth of the latter may work over the platform and rake the cut grain therefrom, the elevated position of the rake-head during its forward movement not allowing it to interfere with the cut grain falling upon the platform.

I claim as new and desire to secure by Letters Patent—

The cam F, in combination with the levers L K, the former being connected to the cam and rake-head by the rods M N, and the latter arranged relatively with the cam F, guide $g$, and rake-head H, substantially as and for the purpose specified.

ASA B. RODMAN.

Witnesses:
   A. F. WHEELER,
   N. CORNING,
   GEORGE SIMONS.